W. M. FISHER,

Assignor, by mesne assignments, to THE AMERICAN BOILER AND FURNACE CO.

No. 9,492. Boiler Furnace.

Reissued Dec. 7, 1880.

Attest:
H. G. Pennie
Chas. E. Tyler.

Inventor:
William M. Fisher
American Boiler & Furnace Co, assignee
by their attorneys
Bills & Doolittle

N. PETERS, PHOTO-LITHOGRAPHER, WASHINGTON, D. C.

UNITED STATES PATENT OFFICE.

WILLIAM M. FISHER, OF CINCINNATI, OHIO, ASSIGNOR, BY MESNE ASSIGNMENTS, TO THE AMERICAN BOILER AND FURNACE COMPANY, OF SAME PLACE.

BOILER-FURNACE.

SPECIFICATION forming part of Reissued Letters Patent No. 9,492, dated December 7, 1880.

Original No. 225,051, dated March 2, 1880. Application for reissue filed October 27, 1880.

*To all whom it may concern:*

Be it known that I, WILLIAM MACK FISHER, a citizen of the United States, residing at Cincinnati, in the county of Hamilton and State of Ohio, have invented certain new and useful Improvements in Boiler-Furnaces; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to certain improvements in steam-boilers, more especially designed for locomotive and marine boilers; and its objects are the attainment of a more perfect combustion and consumption of the combustible gases proceeding from the furnace of such a boiler and the induction of a rapid circulation and vaporization of the water.

To this end the invention in one form, as applied to a locomotive-boiler, consists in arranging in the rear of the fire-box, and between it and the front flue-sheet, a chamber with a perforated bottom, for supplying the hot gases from the fire-box with jets of air in quantities sufficient to attain a more perfect combustion of such gases as they enter the flues of the boiler. The fire-box and air-supply chamber are divided by a hollow partition provided with a large opening for the exit of the gases from the fire-box, and with legs on either side of such opening, joining the crown-sheet of the fire-box, where one leg terminates, while the other leg extends up to a point above the water-line in the boiler and opens in the steam-space thereof, in consequence of which construction a good circulation will be maintained through such water-partition and a rapid generation of steam effected.

Figure 1:
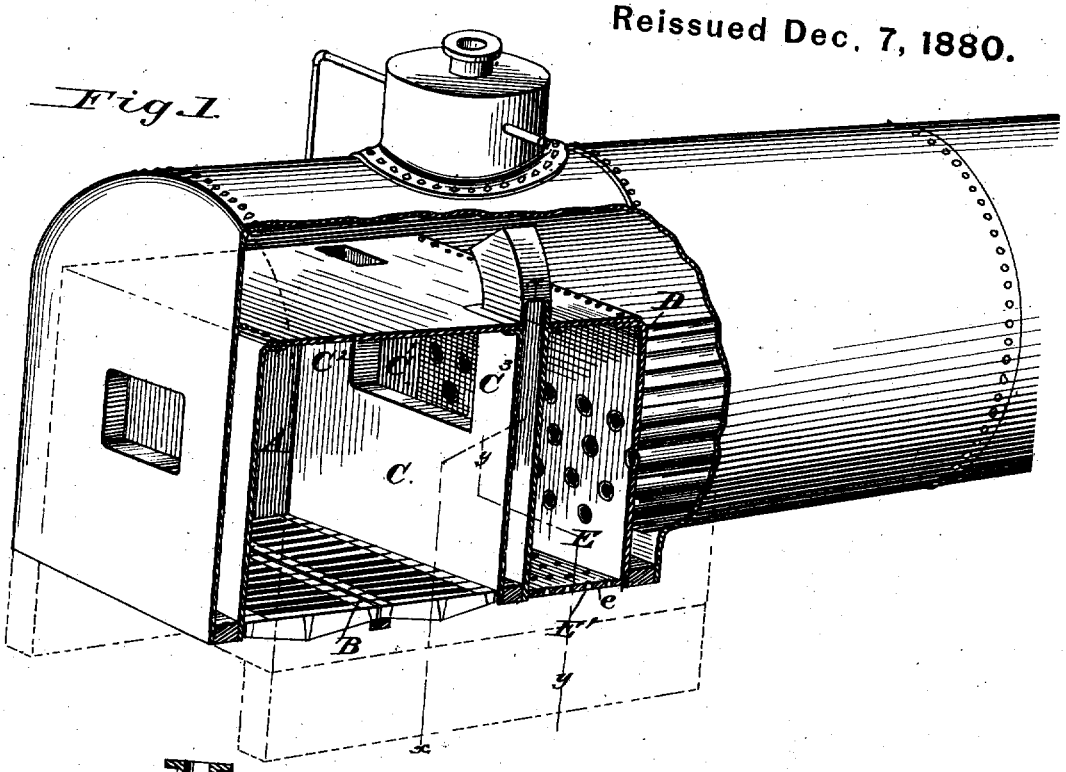
Figure 2:
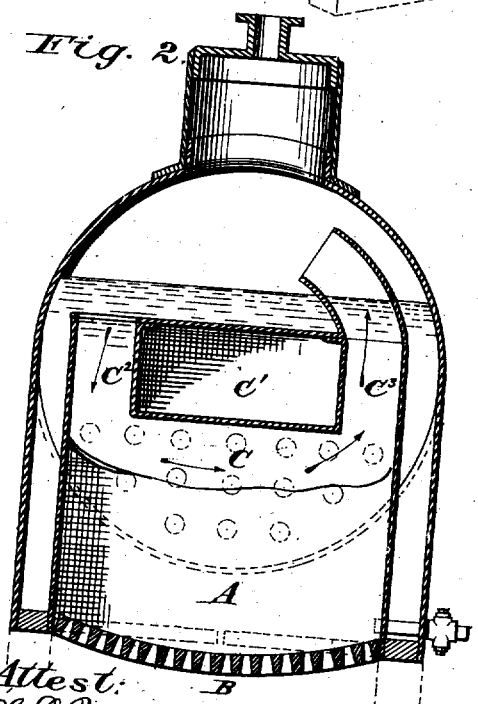
Figure 3:
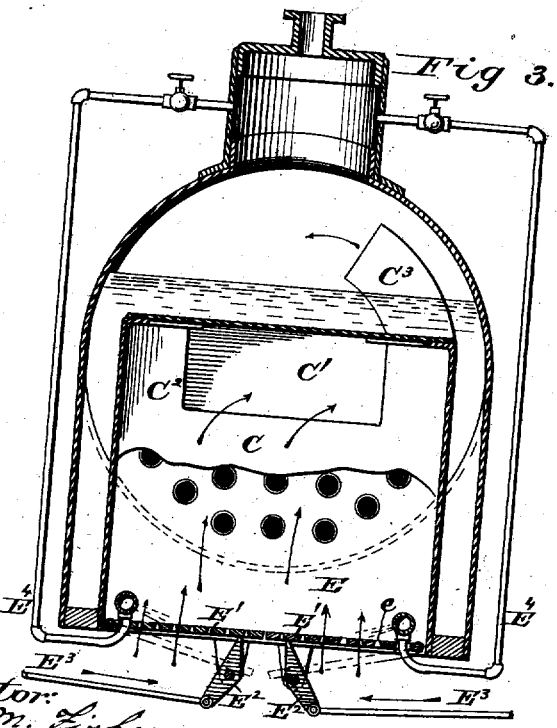

In the annexed drawings, Figure 1 is a perspective view of a steam-boiler provided with my invention. Fig. 2 is a transverse section in planes indicated by the broken line *x x* of Fig. 1. Fig. 3 is a transverse section in planes indicated by the broken line *y y* of Fig. 1.

The same letters of reference are used in all the figures in the designation of the same parts.

The fire-box A, wherein coal is to be burned on the grate-surface B, may be of the ordinary construction, except that the back is formed by a water-partition, C, instead of by the front flue-sheet, D, of the boiler, as is usual. Between this water-partition C and the front flue-sheet, D, a chamber, E, is formed, the area of which may be about one-third (more or less) of that of the grate-surface of the fire-box. The bottom of this chamber E has multitudinous perforations *e*, through which air enters the chamber in numerous fine jets.

The water-partition C is provided with a large opening, C′, extending down from the crown-sheet of the fire-box, for the escape of the gases, smoke, &c., from the fire-box. On their way to the flues of the boiler these products of combustion are met by and are mingled with the air-jets entering the bottom of chamber E, and are thus supplied with the necessary amount of oxygen to insure the complete combustion, practically so, of all the combustible gases and particles escaping from the fire-box in a more or less imperfect state of combustion.

The water-partition has a leg extending upwardly on either side of the opening C′. The leg $C^2$ terminates with the crown-sheet of the fire-box, and opens into the water-space of the boiler. The leg $C^3$ extends through the crown-sheet of the fire-box, and its open end reaches into the steam-space of the boiler. By this means a rapid circulation is effected in the water-partition, which is all important by reason of its having to endure the intense heat of the furnace. The water descends through the short leg, while the steam, rapidly generated in the hollow partition, escapes, mingled with heated water, through the long leg, the circulation being materially helped along by gravitation due to the suspension of the hollow partition below the body of fluid, with which it is directly connected. The upper extremity of leg $C^3$ is curved to direct the current of steam and water toward the opposite side of the boiler.

The bottom of the water-partition may be level, as shown in Fig. 1, or it may be curved, with a view of facilitating the circulation through it, in which case the grate-surface should be curved correspondingly, as shown in Fig. 2.

In the illustrated form of the invention the bottom of the hollow partition is level with the grate-surface.

The perforated bottom of the air-supply chamber E is preferably made of two plates, E′ E′, hinged, as shown in Fig. 3, so that they may be turned down into a position for discharging dust and cinders, if such should be deposited thereon.

The plates may be operated by bell-cranks $E^2$ and rods $E^3$, or by any other suitable or preferred means. Steam-pipes $E^4$ may also be arranged to blow steam over and through the plates E′, if necessary, to clean the perforations. These steam-pipes might discharge into perforated cross-pipes arranged across the hinged ends of the plates E′, and these perforated cross-pipes might constitute the shafts or pintles on which or by which the plates are hinged, and the arrangement of the parts might be such that the lowering of the plates E′ would be accompanied by automatic opening of cocks and the blowing of steam over and through the said plates.

I prefer to extend the elongated leg of the water-partition into the steam-space of the boiler in most cases; but it will be found that its extension up to near the water-level in the boiler will answer in many cases to effect the desired rapid circulation through the said water-partition, and such modification I consider a part of my invention.

What I claim as my invention, and desire to secure by Letters Patent, is—

1. In a boiler-furnace, the hollow water-partition provided with legs of different lengths projecting from its upper side, and applied to the boiler, substantially as before set forth.

2. In a boiler-furnace, the hollow water-partition arranged below the body of the fluid, with which it is directly connected, having at one end of its upper side a short leg communicating with the lower portion of said body of fluid, and at the other end thereof a long leg extending into the upper portion of or above said body of fluid, substantially as set forth.

3. In a boiler-furnace, the hollow water-partition arranged below the body of the fluid, with which it is directly connected, having at one end of its upper side a short leg communicating with the lower portion of said body of fluid, and at the other end thereof a long leg extending into the upper portion of or above said body of fluid, and having a curved extremity, substantially as before set forth.

4. In a steam-boiler, the water-partition provided with water-legs, one terminating flush with the crown-sheet of the fire-box and the other on the opposite side extending into the steam-space of the boiler, in combination with an auxiliary combustion-chamber between the said water-partition and the tube-sheet, the said chamber being provided with a hinged perforated bottom, allowing air in jets, whereby a more perfect combustion is produced and a better circulation of water is maintained, substantially as described.

In testimony that I claim the foregoing I have hereunto set my hand this 11th day of September, 1880.

WILLIAM MACK FISHER.

Witnesses:

B. E. J. EILS,

JOHN H. WOODWARD.